(12) United States Patent
Tzeng et al.

(10) Patent No.: US 7,071,665 B2
(45) Date of Patent: Jul. 4, 2006

(54) METHOD OF REDUCING A RIPPLE OF A HEAVY LOADING PULSE FREQUENCY MODULATED VOLTAGE REGULATOR

(75) Inventors: Guang-Nan Tzeng, Hsinchu (TW); Yung-Chih Chen, Pingtung County (TW); Rong-Chin Lee, Pingtung County (TW)

(73) Assignee: Aimtron Technology Corp., Hsinchu (TW)

( * ) Notice: Subject to any disclaimer, the term of this patent is extended or adjusted under 35 U.S.C. 154(b) by 238 days.

(21) Appl. No.: 10/707,166

(22) Filed: Nov. 25, 2003

(65) Prior Publication Data

US 2005/0111243 A1 May 26, 2005

(51) Int. Cl.
*G05F 1/40* (2006.01)
*G05F 1/56* (2006.01)
*H02M 7/122* (2006.01)

(52) U.S. Cl. .................... 323/282; 323/271; 323/285
(58) Field of Classification Search ................ 323/266, 323/271, 282, 284, 285; 363/41, 50, 56.01, 363/56.12
See application file for complete search history.

(56) References Cited

U.S. PATENT DOCUMENTS

| | | | |
|---|---|---|---|
| 5,568,044 A | | 10/1996 | Bittner |
| 5,748,422 A | * | 5/1998 | Heaston et al. ............... 361/18 |
| 5,801,518 A | | 9/1998 | Ozaki et al. |
| 6,313,616 B1 | * | 11/2001 | Deller et al. ................ 323/282 |
| 6,388,433 B1 | * | 5/2002 | Marty ........................ 323/284 |
| 6,545,882 B1 | | 4/2003 | Yang |
| 6,577,110 B1 | * | 6/2003 | Van Auken ................ 323/282 |
| 6,714,425 B1 | * | 3/2004 | Yamada et al. .......... 363/21.12 |
| 6,801,024 B1 | * | 10/2004 | Bernardon .................. 323/224 |

OTHER PUBLICATIONS

Maxim Integrated Products Data Sheet No. 19-0113 Rev. 2, Jan. 1995, pp. 1-8.

\* cited by examiner

*Primary Examiner*—Matthew V. Nguyen
(74) *Attorney, Agent, or Firm*—Winston Hsu

(57) ABSTRACT

In a pulse frequency modulated (PFM) voltage regulator, a PFM switching signal is provided for converting a DC voltage source to an output voltage. The output voltage is detected. When the output voltage is lower than a predetermined target voltage, a duty cycle of the PFM switching signal is reduced. For example, a minimum OFF-time of the PFM switching signal may be prolonged or a constant ON-time of the PFM switching signal may be shortened. In other words, a period of delivering energy to a capacitor from an inductor may be prolonged or a period of storing energy in the inductor may be shortened. Therefore, a ripple of the output voltage is effectively reduced when the PFM voltage regulator is operated in a heavy loading condition.

19 Claims, 6 Drawing Sheets

METHOD OF REDUCING A RIPPLE OF A HEAVY LOADING PULSE FREQUENCY MODULATED VOLTAGE REGULATOR

BACKGROUND OF INVENTION

1. Field of the Invention

The present invention relates to a pulse frequency modulated (PFM) voltage regulator and, more particularly, to a method of reducing a ripple of an output voltage of the PFM voltage regulator in a heavy loading condition.

2. Description of the Related Art

Typically, a voltage regulator is used for supplying an output voltage with a regulated voltage level from a DC voltage source by appropriately controlling a duty cycle of a power switch transistor. Depending on requirements of practical applications, the regulated output voltage may be higher or lower than the original DC voltage source. Of methods for controlling the duty cycle of the power switch transistor in the voltage regulator, the most frequently used are a PFM switching control mode and a pulse width modulated (PWM) switching control mode. The PFM voltage regulator turns on the power switch transistor each time when the output voltage decreases to become equal to a target voltage, thereby regulating the output voltage. On the other hand, the PWM voltage regulator controls the on and off states of the power switch transistor by a rectangular wave having a predetermined duty cycle, thereby achieving the effect of regulating the output voltage.

Neither the PFM voltage regulator nor the PWM voltage regulator can provide the same satisfactory performance when operated both in a light loading condition and in a heavy loading condition. More specifically, the PFM voltage regulator in the heavy loading condition suffers from a great ripple of the output voltage. On the other hand, the PWM voltage regulator has a drawback of becoming a low efficiency regulator in the light loading condition since the power consumption caused by the switching of the power switch transistor becomes relatively large with respect to the output power supplied.

Both of U.S. Pat. No. 5,568,044 and U.S. Pat. No. 6,545,882 have disclosed a PWM voltage regulator characterized in that an original PWM control mode is changed to a PFM control mode in a light loading condition by detecting an inductor current in order to improve the efficiency of the light loading PWM voltage regulator. However, the prior art voltage regulator is required to employ a complicated PWM and PFM dual mode switching circuit.

Alternatively, U.S. Pat. No. 5,801,518 has disclosed a PFM voltage regulator characterized in that an ON-time of the power switch transistor is prolonged and/or an OFF-time of the power switch transistor is shortened in accordance with a degree of decrease for an output voltage. The prior art considers that a longer ON-time may cause more energy to be stored in an inductor and a shorter OFF-time may prevent a capacitor from discharging too much, so the PFM voltage regulator may have an improved output ripple in the heavy loading condition. Contrary to the assumptive consideration, the prior art voltage regulator in practice provides an even larger output ripple. With reference to a paragraph of lines 31 to 35, column 8 in the specification of U.S. Pat. No. 5,801,518, it is assumed that the output voltage of the PFM voltage regulator rises to the maximum possible peak value immediately after the energy stored in the inductor is delivered to the capacitor, i.e. at the instant when the power switch transistor is turned off, and then decreases along with time. As a matter of fact, this assumption cannot be established for a heaving loading PFM voltage regulator, which will be described in more detail later. This is the reason why U.S. Pat. No. 5,801,518 failed to improve the ripple.

FIG. 1($a$) is a circuit block diagram showing a conventional PFM voltage regulator 10. Referring to FIG. 1($a$), when a power switch transistor Q, such as an NMOS transistor, is at the ON state, a potential at a node A is lower than a potential at an output terminal B, i.e. an output voltage $V_{out}$, such that a diode D is unconductive. Therefore, an inductor L stores energy supplied from a DC voltage source $V_{in}$, resulting in a linear increase of an inductor current $I_L$. Meanwhile, a capacitor C is discharged to supply a load current $I_{load}$, resulting in a decrease of the output voltage $V_{out}$ at the output terminal B. When the power switch transistor Q is at an OFF state, the energy stored in the inductor L is delivered to the capacitor C through the conductive diode D, thereby raising the output voltage $V_{out}$ at the output terminal B.

More specifically, a PFM switching controller 11 generates a PFM switching signal 12 for controlling the ON and OFF states of the power switch transistor Q through a driver 13. The PFM switching signal 12 is a pulse signal, each pulse of which may make the power switch transistor Q conductive, for example. In this case, an internal between two consecutive pulses is representative of a period during which the power switch transistor Q is unconductive. The pulse width of the PFM switching signal 12 is in principle a fixed value, which is determined by a constant ON-time controller 14. However, when an over current protection circuit 15 detects that the inductor current $I_L$ is higher than a predetermined upper limit of current, the over current protection circuit 15 causes the PFM switching controller 11 to shorten the pulse width of the PFM switching signal 12. On the other hand, the interval between two consecutive pulses of the PFM switching signal 12 is determined by a feedback circuit 16. When the feedback circuit 16 detects that the output voltage $V_{out}$ at the output terminal B is lower than the target voltage due to the discharge of the capacitor, the feedback circuit 16 causes the PFM switching controller 11 to output a pulse for conducting the power switch transistor Q again. However, the interval between two consecutive pulses are prevented from being shorter than a minimum OFF-time determined by a minimum OFF-time controller 17.

FIG. 1($b$) is a waveform timing chart showing an operation of the conventional heavy loading PFM voltage regulator 10 shown in FIG. 1($a$). During a period P1, when the output voltage $V_{out}$ decreases to become lower than the target voltage $V_o$, i.e. a DC component of the output voltage $V_{out}$, the PFM switching signal 12 enters a high level state H with a constant pulse width (or ON-time) $T_{ON,\ con}$, resulting in the linear increase of the inductor current $I_L$ for storing energy in the inductor L. As clearly seen from FIG. 1($b$), the output voltage $V_{out}$ in a heavy loading condition exhibits a considerably large degree of decrease during the constant ON-time $T_{ON,\ con}$. After the constant ON-time $T_{ON,\ con}$, the PFM switching signal 12 enters a low level state L such that the energy stored in the inductor L is delivered to the capacitor C, thereby raising the output voltage $V_{out}$. However, the output voltage $V_{out}$ is still lower than the target voltage $V_o$ even after the capacitor C is charged for a minimum OFF-time $T_{OFF,\ min}$ because in the heavy loading condition a component of the inductor current $I_L$ applicable for charging the capacitor C becomes relatively smaller. At this moment, the PFM switching controller 11 causes the PFM switching signal 12 to enter again the high level state H with the constant ON-time $T_{ON,\ con}$. As clearly seen from FIG. 1(b), during the minimum OFF-time $T_{OFF, min}$, the energy stored in the inductor L fails to be completely delivered to the capacitor C, which is contrary to the assumption of U.S. Pat. No. 5,801,518, since the inductor current $I_L$ does not decrease to zero, resulting in the impossibility of reaching the maximum possible peak value for the output voltage $V_{out}$. In this case, during periods P2 and P3 the inductor current $I_L$ due to continuous accumulation eventually reaches the upper limit of current $I_{max}$, resulting in the shortening of the constant ON-time $T_{ON, con}$ of the PFM switching signal 12.

When the power switch transistor Q after switching between on and off many times is turned off again during the period P3, the output voltage $V_{out}$ finally raises over the target voltage $V_o$. As a result, the energy continuously stored in the inductor L is completely delivered at a time to the capacitor C, causing a very great output ripple. It takes a significantly long OFF-time for the output voltage $V_{out}$ to decrease back to the target voltage $V_o$ from the maximum value $V_{high}$. Thereafter, the PFM switching signal 12 enters the high level state H with the constant ON-time $T_{ON, con}$ for turning on the power switch transistor Q to repeat the operations described above. As clearly seen from FIG. 1(b), the output voltage $V_{out}$ generated from the conventional PFM voltage regulator 10 has a very great ripple 19 in the heavy loading condition.

Since the delivery of the energy between the inductor L and the capacitor C fails to achieve a good efficiency as described above, the conventional PFM voltage regulator 10 inevitably spends an disadvantageously longer time on a transient period from start-up to a stable operational state where the output voltage $V_{out}$ reaches the target voltage $V_o$.

SUMMARY OF INVENTION

In view of the above-mentioned problems, an object of the present invention is to provide a method of reducing a ripple for improving an output voltage of a heavy loading PFM voltage regulator.

Another object of the present invention is to provide a method of reducing a ripple for achieving a PFM voltage regulator operable not only in a light loading condition but also in a heavy loading condition.

Still another object of the present invention is to provide a method of reducing a ripple for shortening a transient period of a PFM voltage regulator from start-up to a stable operational state.

In a PFM voltage regulator, a PFM switching signal is provided for converting a DC voltage source to an output voltage. The output voltage is detected. When the output voltage is lower than a predetermined target voltage, a duty cycle of the PFM switching signal is reduced. Therefore, a ripple of the output voltage is effectively reduced when the PFM voltage regulator is operated in a heavy loading condition. The reduction of the duty cycle of the PFM switching signal may be implemented by prolonging a minimum OFF-time of the PFM switching signal. Alternatively, the reduction of the duty cycle of the PFM switching signal may be implemented by shortening a constant ON-time of the PFM switching signal.

Preferably, the minimum OFF-time of the PFM switching signal is prolonged along with an increase of an absolute difference between the output voltage and the target voltage. Preferably, the constant ON-time of the PFM switching signal is shortened along with an increase of an absolute difference between the output voltage and the target voltage.

According to another aspect of the present invention, the PFM voltage regulator includes an inductive means and a capacitive means. The inductive means is coupled to a DC voltage source. The capacitive means has a terminal which is coupled to the inductive means and provides an output voltage. When the output voltage is lower than a target voltage, a period of delivering energy from the inductive means to the capacitive means is prolonged and/or a period of storing energy in the inductive means is shortened. Therefore, a ripple of the output voltage is effectively reduced when the PFM voltage regulator is operated in a heavy loading condition.

Preferably, the period of delivering energy from the inductive means to the capacitive means is prolonged along with an increase of an absolute difference between the output voltage and the target voltage. Preferably, the period of storing energy in the inductive means is shortened along with an increase of the absolute difference between the output voltage and the target voltage.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1A:
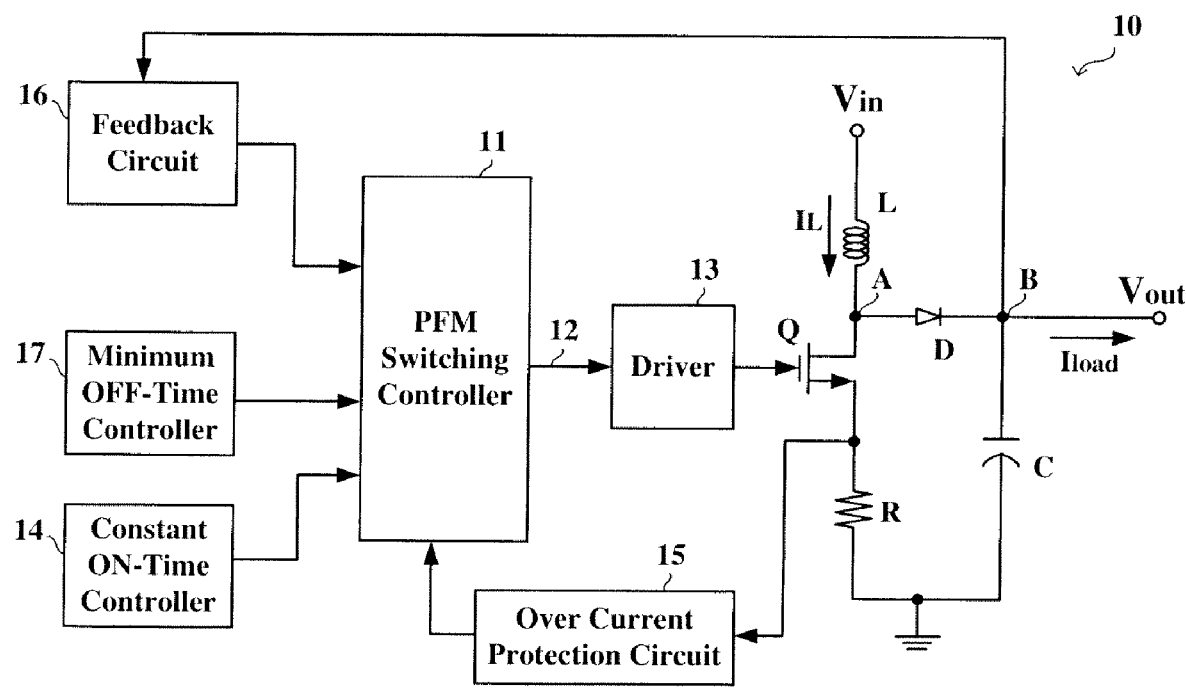
FIG. 1(a) is a circuit block diagram showing a conventional PFM voltage regulator.
Figure 1B:
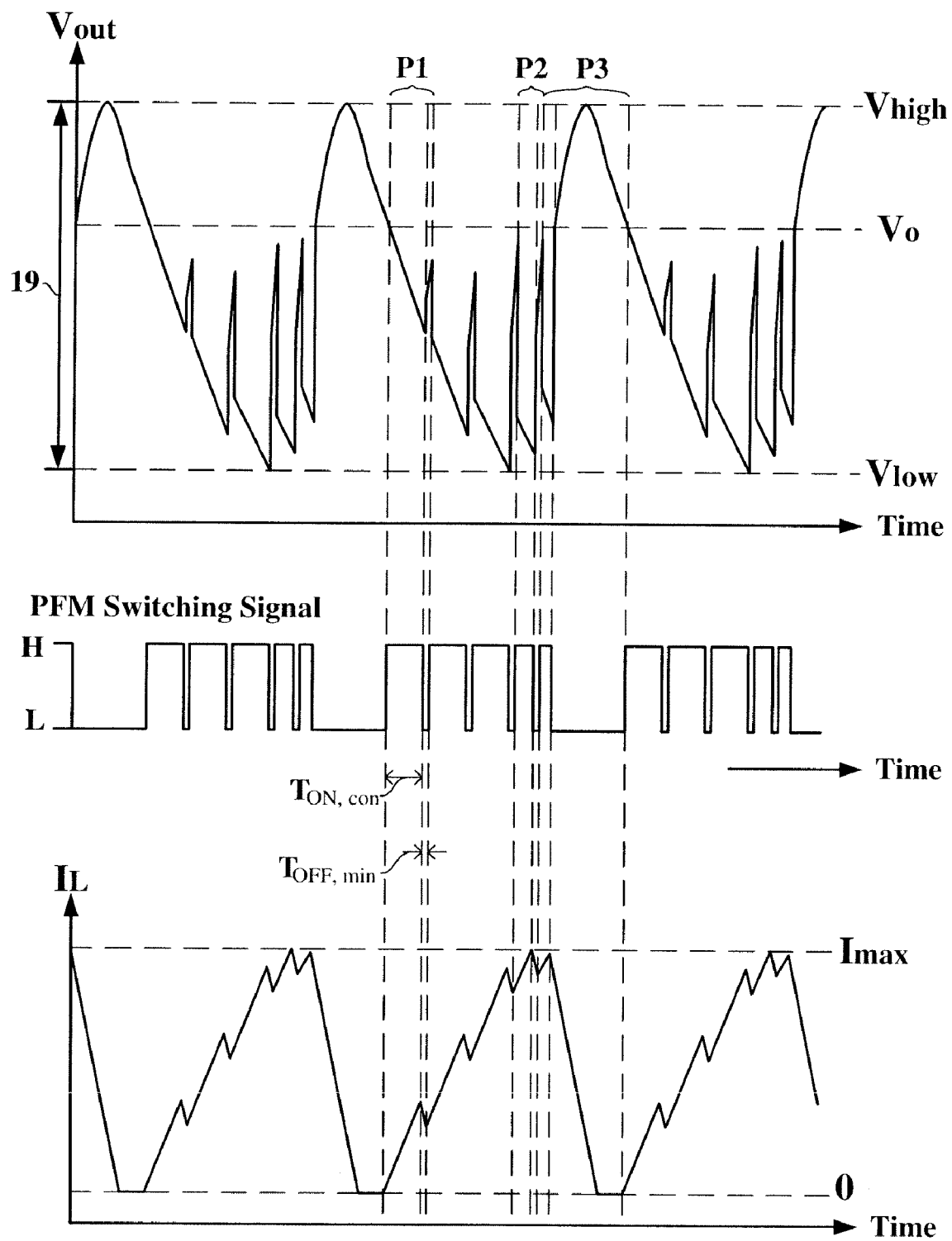
FIG. 1(b) is a waveform timing chart showing an operation of the conventional heavy loading PFM voltage regulator shown in FIG. 1(a)

For clearer appreciation of features of the present invention, described first is how U.S. Pat. No. 5,801,518 adversely causes an even greater output ripple. Because the output voltage $V_{out}$ in the heavy loading condition makes a change with a relatively larger degree of decrease during the OFF state of the power switch transistor Q (referred to as an OFF-time hereinafter), the prior art suggests that a shorter OFF-time be used to prevent the output voltage $V_{out}$ from decreasing too much and a longer conductive time of the power switch transistor Q (referred to as an ON-time hereinafter) be used to store more energy in the inductor L for supplementing the capacitor C later. However, as shown in FIG. 1(b), once the output voltage $V_{out}$ is lower than the target voltage $V_o$, the longer ON-time adversely causes the output voltage $V_{out}$ to decrease more deeply and results in a larger inductor current $I_L$. Moreover, the shorter OFF-time much more prevents the energy stored in the inductor L from sufficiently delivering to the capacitor C, which is just contrary to the assumptive supplementation effect expected by the prior art.

Figure 2A:
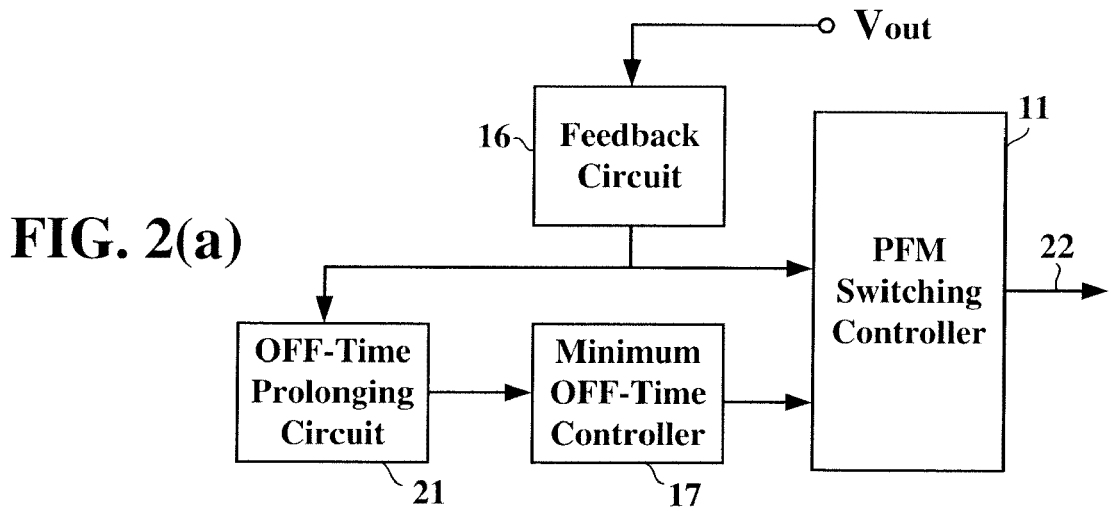
FIGS. 2(a) to 2(c) are schematic diagrams showing a method of reducing a ripple of a heavy loading PFM voltage regulator according to a first embodiment of the present invention.
Figure 2B:
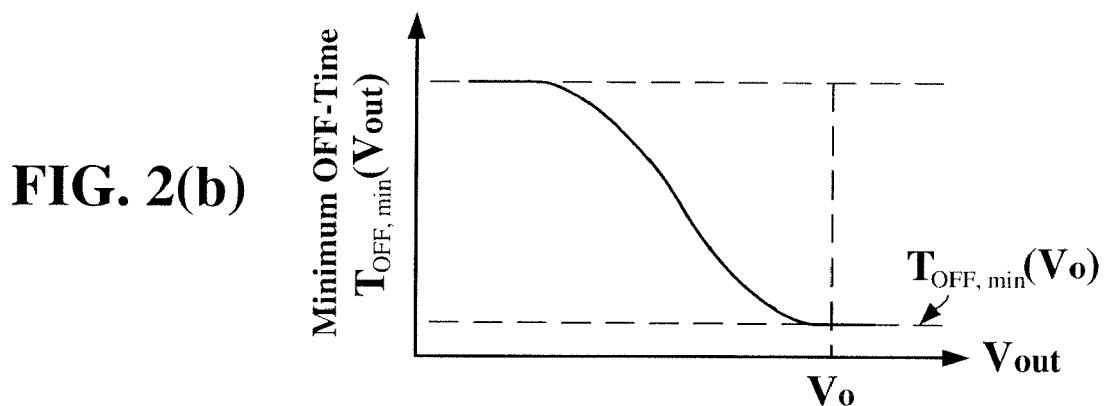
Figure 2C:
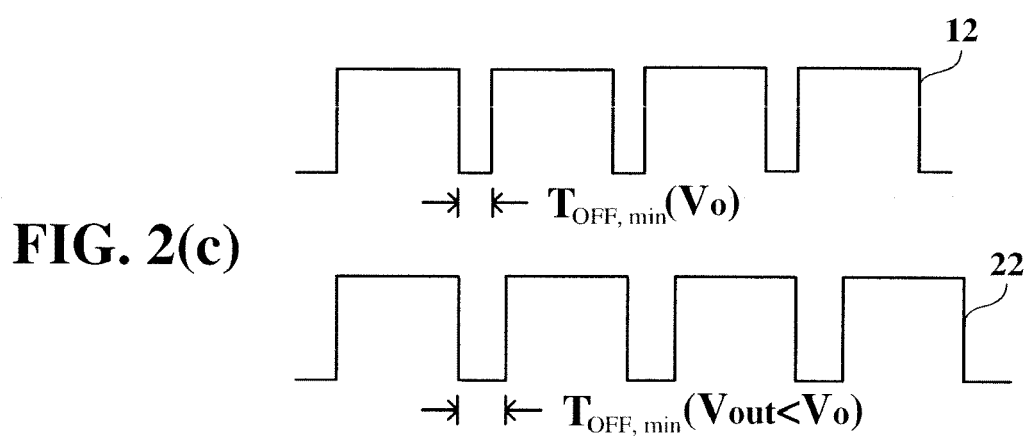

FIGS. 2(a) to 2(c) are schematic diagrams showing a method of reducing a ripple of a heavy loading PFM voltage regulator according to a first embodiment of the present invention. Referring to FIG. 2(a), the first embodiment according to the present invention additionally provides the PFM voltage regulator 10 shown in FIG. 1(a) with an OFF-time prolonging circuit 21 for achieving the object of reducing the output ripple. For easier appreciation of the inventive features, the PFM voltage regulator according to the present invention is only partially shown in FIG. 2(a) with an undepicted portion, which should refer to the PFM voltage regulator 10 shown in FIG. 1(a). More specifically, the feedback circuit 16 after monitoring the output voltage $V_{out}$ outputs a feedback signal not only to the PFM switching controller 11 but also to the OFF-time prolonging circuit 21. When the output voltage $V_{out}$ is lower than the target voltage $V_o$, the OFF-time prolonging circuit 21 prolongs the minimum OFF-time $T_{OFF, min}$ determined by the minimum OFF-time controller 17, thereby causing the PFM switching controller 11 to generate a PFM switching signal 22 with a prolonged minimum OFF-time.

More specifically, the OFF-time prolonging circuit 21 is cooperated with the minimum OFF-time controller 17 for determining the extendable minimum OFF-time $T_{OFF, min}$ of the PFM switching signal 22 based on the output voltage $V_{out}$. For example, as shown in FIG. 2(b), the extendable minimum OFF-time $T_{OFF, min}$ of the PFM switching signal 22 may be a locally continuously decreasing function of the output voltage $V_{out}$, which is mathematically expressed as $T_{OFF, min}(V_{out})$. When the output voltage $V_{out}$ is higher than or equal to the target voltage $V_o$, the extendable minimum OFF-time $T_{OFF, min}$ has a minimum $T_{OFF, min}(V_o)$. When the output voltage $V_{out}$ is lower than the target voltage $V_o$, the extendable minimum OFF-time $T_{OFF, min}$ increases along with an increase of an absolute difference between the output voltage $V_{out}$ and the target voltage $V_o$. It should be noted that the present invention may be also applicable to a case where the extendable minimum OFF-time $T_{OFF, min}$ is a stepwise decreasing function of the output voltage $V_{out}$ or other types of functions as long as the functional relationship between the extendable minimum OFF-time $T_{OFF, min}$ and the output voltage $V_{out}$ satisfies the following inequality (1):

$$T_{OFF, min}(V_{out} < V_o) > T_{OFF, min}(V_{out} = V_o) = T_{OFF, min}(V_{out} > V_o) \quad (1)$$

Referring to FIG. 2(c), when the output voltage $V_{out}$ is lower than the target voltage $V_o$, the OFF-time of the conventional PFM switching signal 12 remains at the minimum OFF-time $T_{OFF, min}(V_o)$ regardless of the output voltage $V_{out}$. As compared, in the first embodiment according to the present invention, when the output voltage $V_{out}$ is lower than the target voltage $V_o$, the OFF-time of the PFM switching signal 22 is a prolonged minimum OFF-time $T_{OFF, min}(V_{out} < V_o)$ determined in accordance with the output voltage $V_{out}$.

In the first embodiment according to the present invention, because the minimum OFF-time $T_{OFF, min}$ of the PFM switching signal 22 is prolonged, the energy stored in the inductor L obtains a more sufficient period for delivering to the capacitor C, thereby preventing the inductor current $I_L$ from continuous accumulation. In addition, the output voltage $V_{out}$ has a relatively gentler degree of decrease since the energy stored in the inductor L delivers to the capacitor C for the more sufficient period. As a result, the ripple of the output voltage $V_{out}$ is effectively reduced.

Figure 3A:
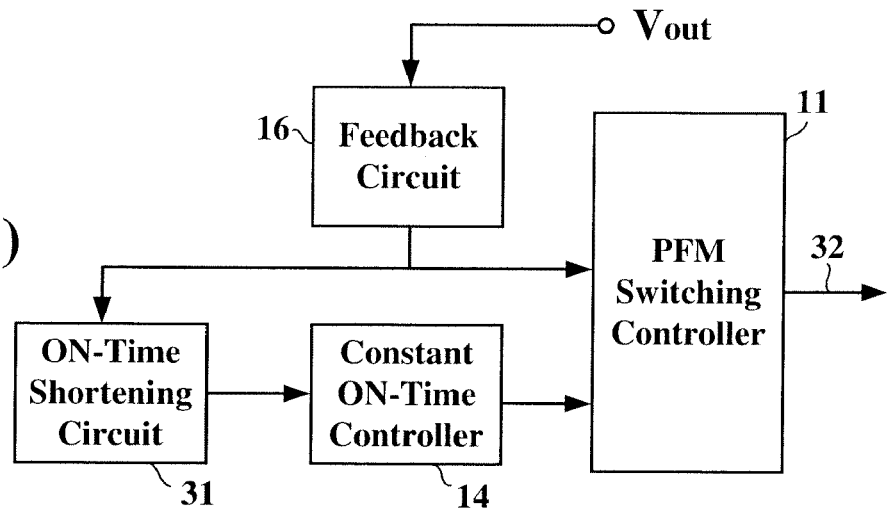
FIGS. 3(a) to 3(c) are schematic diagrams showing a method of reducing a ripple of a heavy loading PFM voltage regulator according to a second embodiment of the present invention.
Figure 3B:
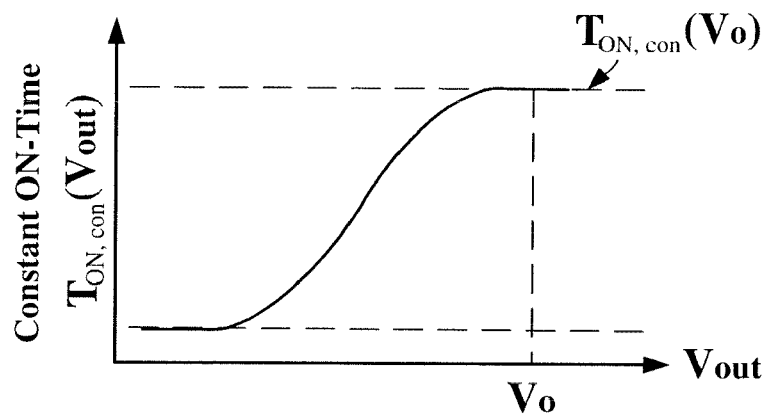
Figure 3C:
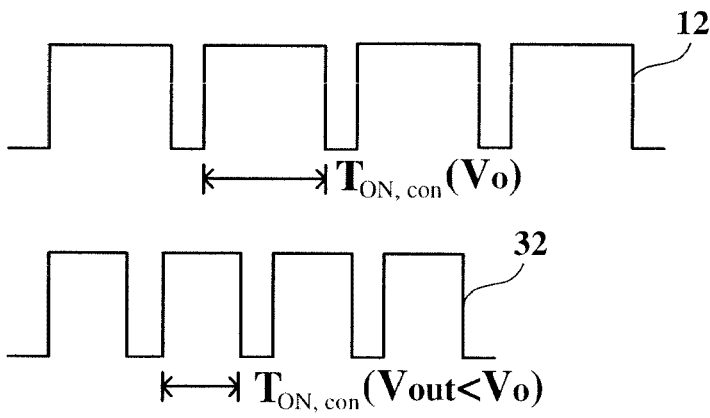

FIGS. 3(a) to 3(c) are schematic diagrams showing a method of reducing a ripple of a heavy loading PFM voltage regulator according to a second embodiment of the present invention. Referring to FIG. 3(a), the second embodiment according to the present invention additionally provides the PFM voltage regulator 10 shown in FIG. 1(a) with an ON-time shortening circuit 31 for achieving the object of reducing the output ripple. For easier appreciation of the inventive features, the PFM voltage regulator according to the present invention is only partially shown in FIG. 3(a) with an undepicted portion, which should refer to the PFM voltage regulator 10 shown in FIG. 1(a). More specifically, the feedback circuit 16 after monitoring the output voltage $V_{out}$ outputs a feedback signal not only to the PFM switching controller 11 but also to the ON-time shortening circuit 31. When the output voltage $V_{out}$ is lower than the target voltage $V_o$, the ON-time shortening circuit 31 shortens the constant ON-time $T_{ON, con}$ determined by the constant ON-time controller 14, thereby causing the PFM switching controller 11 to generate a PFM switching signal 32 with a shortened constant ON-time.

More specifically, the ON-time shortening circuit 31 is cooperated with the constant ON-time controller 14 for determining the reducible constant ON-time $T_{ON, con}$ of the PFM switching signal 32 based on the output voltage $V_{out}$. For example, as shown in FIG. 3(b), the reducible constant ON-time $T_{ON, con}$ of the PFM switching signal 32 may be a locally continuously increasing function of the output voltage $V_{out}$, which is mathematically expressed as $T_{ON, con}(V_{out})$. When the output voltage $V_{out}$ is higher than or equal to the target voltage $V_o$, the reducible constant ON-time $T_{ON, con}$ has a maximum $T_{ON, con}(V_o)$. When the output voltage $V_{out}$ is lower than the target voltage $V_o$, the reducible constant ON-time $T_{ON, con}$ decreases along with a decrease of an absolute difference between the output voltage $V_{out}$ and the target voltage $V_o$. It should be noted that the present invention may be also applicable to a case where the reducible constant ON-time $T_{ON, con}$ is a stepwise increasing function of the output voltage $V_{out}$ or other types of functions as long as the functional relationship between the reducible constant ON-time $T_{ON, con}$ and the output voltage $V_{out}$ satisfies the following inequality (2):

$$T_{ON, con}(V_{out} < V_o) < T_{ON, con}(V_{out} = V_o) = T_{ON, con}(V_{out} > V_o) \quad (2)$$

Referring to FIG. 3(c), when the output voltage $V_{out}$ is lower than the target voltage $V_o$, the ON-time of the conventional PFM switching signal 12 remains at the constant ON-time $T_{ON, con}(V_o)$ regardless of the output voltage $V_{out}$. As compared, in the second embodiment according to the present invention, when the output voltage $V_{out}$ is lower than the target voltage $V_o$, the ON-time of the PFM switching signal 32 is a shortened constant ON-time $T_{ON, con}(V_{out} < V_o)$ determined in accordance with the output voltage $V_{out}$.

In the second embodiment according to the present invention, because the constant ON-time $T_{ON, con}$ of the PFM switching signal 32 is shortened, the period spent on storing energy in the inductor L is shortened, thereby preventing the inductor current $I_L$ from continuous accumulation. In addition, the OFF-time becomes relatively longer with respect to the shortened constant ON-time $T_{ON, con}$ such that the energy stored in the inductor L more efficiently delivers to the capacitor C. As a result, the ripple of the output voltage $V_{out}$ is effectively reduced.

Conclusively speaking, the first embodiment shown in FIGS. 2(a) to 2(c) and the second embodiment shown in FIGS. 3(a) to 3(c) are grounded on the same inventive principle. That is, when the output voltage $V_{out}$ is lower than the target voltage $V_o$, the effect of reducing the output ripple is achieved by reducing the duty cycle of the PFM switching signal. Because the duty cycle of the PFM switching signal is defined by a ratio of an ON-time to a period consisting of the ON-time and an OFF-time, i.e. ON-time/(ON-time+ OFF-time), the reduction of the duty cycle of the PFM switching signal may be implemented by either prolonging the OFF-time or shortening the ON-time. Of course, it is also effective to simultaneously prolong the OFF-time and shorten the ON-time.

Figure 4A:
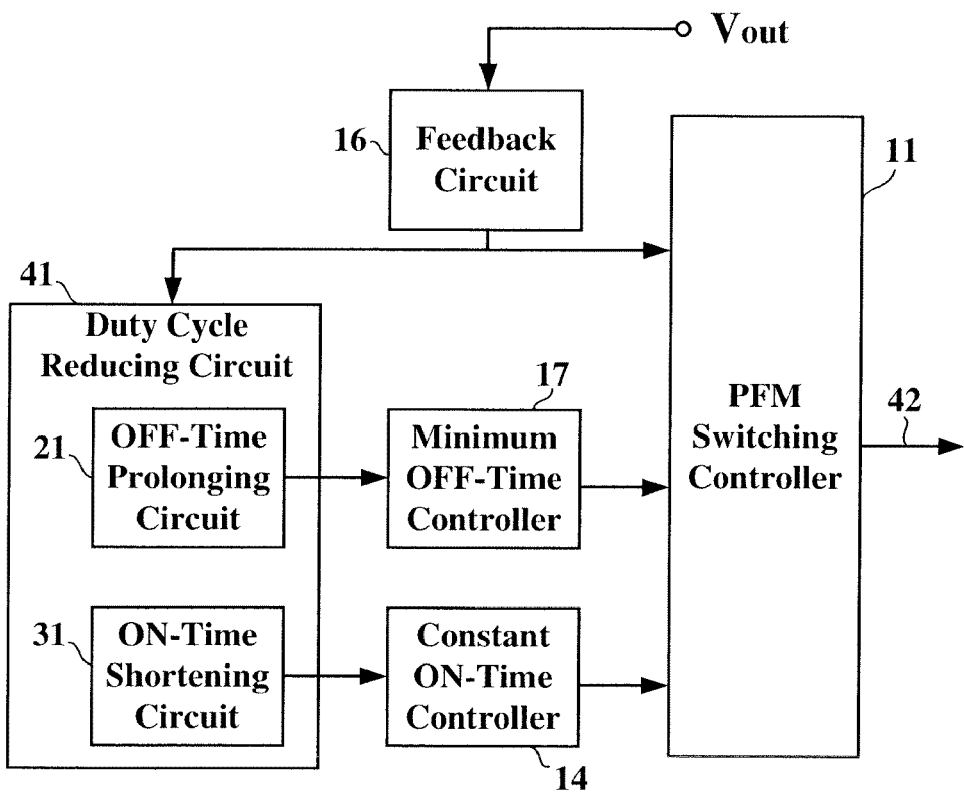
FIGS. 4(a) and 4(b) are schematic diagrams showing a method of reducing a ripple of a heavy loading PFM voltage regulator according to a third embodiment of the present invention.
Figure 4B:
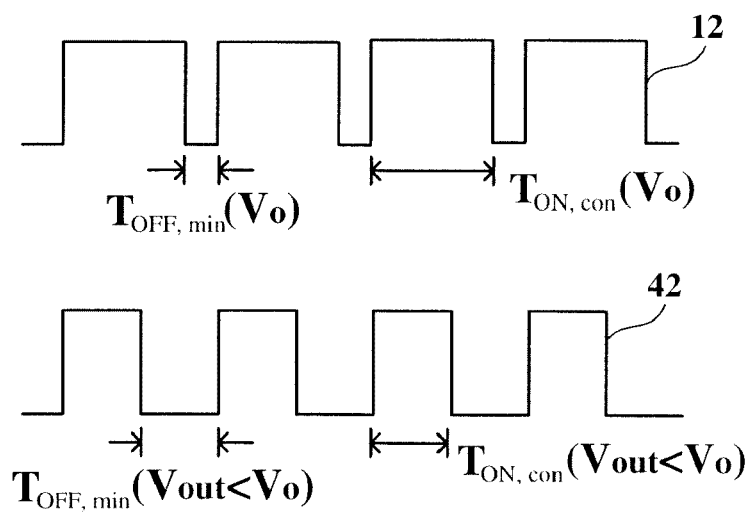

FIGS. 4(a) and 4(b) are schematic diagrams showing a method of reducing a ripple of a heavy loading PFM voltage regulator according to a third embodiment of the present invention. Referring to FIG. 4(a), the third embodiment is a case where the first and second embodiments are incorporated together for being simultaneously implemented. More specifically, the feedback circuit 16 after monitoring the output voltage $V_{out}$ outputs a feedback signal not only to the PFM switching controller 11 but also to a duty cycle reducing circuit 41. The duty cycle reducing circuit 41 includes the OFF-time prolonging circuit 21 as described in the first embodiment and the ON-time shortening circuit 31 as described in the second embodiment, which are coupled to the minimum OFF-time controller 17 and the constant ON-time controller 14, respectively. When the output voltage $V_{out}$ is lower than the target voltage $V_o$, the duty cycle reducing circuit 41 prolongs the minimum OFF-time $T_{OFF, min}$ through the OFF-time prolonging circuit 21 and shortens the constant ON-time $T_{ON, con}$ through the ON-time shortening circuit 31, thereby causing the PFM switching controller 11 to generate a PFM switching signal 42 with a reduced duty cycle. In the third embodiment, when the output voltage $V_{out}$ is lower than the target voltage $V_o$, the duty cycle of the PFM switching signal 42 decreases along with an increase of an absolute difference between the output voltage $V_{out}$ and the target voltage $V_o$, which may be obviously derived from FIGS. 2(b) and 3(b) and will not described in detail hereinafter.

Referring to FIG. 4(b), when the output voltage $V_{out}$ is lower than the target voltage $V_o$, the OFF-time of the conventional PFM switching signal 12 remains at the minimum OFF-time $T_{OFF, min}(V_o)$ and the ON-time thereof remains at the constant ON-time $T_{ON, con}(V_o)$ regardless of the output voltage $V_o$. As compared, in the third embodiment according to the present invention, when the output voltage $V_{out}$ is lower than the target voltage $V_o$, the OFF-time of the PFM switching signal 42 is the prolonged minimum OFF-time $T_{OFF, min}(V_{out}<V_o)$ determined in accordance with the output voltage $V_{out}$ and the ON-time thereof is the shortened constant ON-time $T_{ON, con}(V_{out}<V_o)$ determined in accordance with the output voltage $V_{out}$. As a result, the duty cycle of the PFM switching signal 42 is smaller than that of the conventional PFM switching signal 12.

Figure 5A:
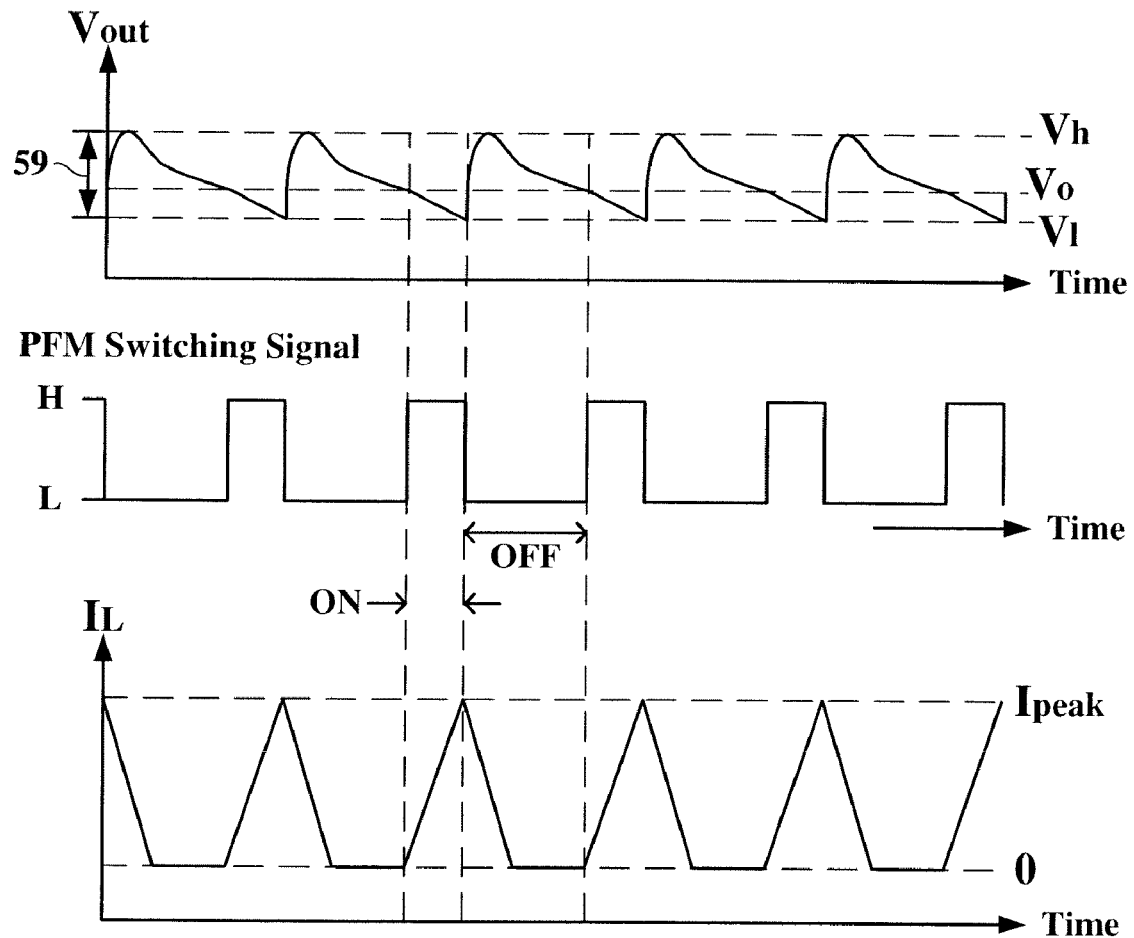
FIGS. 5(a) and 5(b) are timing charts showing an operation of a heavy loading PFM voltage regulator using a method according to the present invention.
Figure 5B:
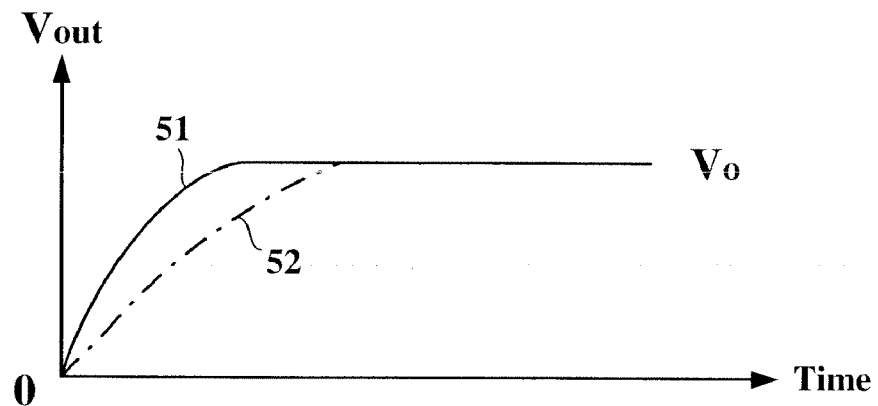

FIGS. 5(a) and 5(b) are timing charts showing an operation of the heavy loading PFM voltage regulator using the method according to the present invention. Referring to FIG. 5(a), when the output voltage $V_{out}$ is lower than the target voltage $V_o$, switching the transistor only one time is sufficient for the PFM voltage regulator using the method according to the present invention to raise the output voltage $V_{out}$ over the target voltage $V_o$. Therefore, the output voltage $V_{out}$ is prevented from decreasing with a great degree. In addition, the peak value $I_{peak}$ of the inductor current $I_L$ is far lower than the upper limit of current $I_{max}$ since the inductor current $I_L$ is prevented from continuous accumulation. Therefore, the output voltage $V_{out}$ does not exhibit a great protrusive waveform once the energy stored in the inductor L is delivered to the capacitor C during the OFF-time. From the comparison between FIG. 5(a) and FIG. 1(b), the PFM voltage regulator using the method according to the present invention effectively reduces a ripple 59 of the output voltage $V_{out}$ in the heavy loading condition.

In addition to the advantage of reducing the output ripple, the method according to the present invention further provides another advantage of shortening a transient period spent by the PFM voltage regulator from start-up to a stable operational state where the output voltage $V_{out}$ reaches the target voltage $V_o$. Referring to FIG. 5(b), a solid line 51 is representative of a change of the output voltage $V_{out}$ along with time for the PFM voltage regulator using the method according to the present invention from start-up to a stable operational state while the dotted line 52 is representative of a change of the output voltage $V_{out}$ along with time for the conventional PFM voltage regulator from start-up to a stable operational state. Because the method according to the present invention prolongs the minimum OFF-time and/or shortens the constant ON-time when the output voltage $V_{out}$ is lower than the target voltage $V_o$, the energy stored in the inductor L is more efficiently delivered to the capacitor C, the inductor current $I_L$ is prevented from continuous accumulation, and the degree of decrease for the output voltage $V_{out}$ becomes relatively gentler. As a result, the output voltage $V_{out}$ of the PFM voltage regulator using the method according to the present invention reaches the target voltage $V_o$ in a shorter period of time.

It should be noted that although the embodiments described above are applied to the step-up (or boost) PFM voltage regulator, the present invention is not limited to this and may be applied to a step-down (or buck) PFM voltage regulator for reducing the output ripple and shortening the transient period spent from start-up to a stable operational state. Moreover, although the embodiments described above are applied to the discontinuous mode PFM voltage regulator, the present invention is not limited to this and may be applied to a continuous mode PFM voltage regulator.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

The invention claimed is:

1. A method of reducing a ripple of a pulse frequency modulated (PFM) voltage regulator for converting a DC voltage source to an output voltage, comprising:
   using a PFM switching signal for converting the DC voltage source to the output voltage such that the PFM switching signal turns on a power switch transistor during an ON-time and turns off the power switch transistor during an OFF-time, in which the ON-time is shorter than or equal to a predetermined constant ON-time and the OFF-time is longer than or equal to a predetermined minimum OFF-time;
   detecting the output voltage; and
   reducing a duty cycle of the PFM switching signal when the output voltage is lower than a predetermined target voltage, whereby:
   reducing the ripple of the output voltage.

2. The method according to claim 1, wherein:
the step of reducing the duty cycle of the PFM switching signal is implemented by prolonging the predetermined minimum OFF-time of the PFM switching signal.

3. The method according to claim 2, wherein:
the predetermined minimum OFF-time of the PFM switching signal is prolonged in accordance with an absolute difference between the output voltage and the predetermined target voltage.

4. The method according to claim 3, wherein:
the predetermined minimum OFF-time of the PFM switching signal is prolonged along with an increase of the absolute difference between the output voltage and the predetermined target voltage.

5. The method according to claim 1, wherein:
the step of reducing the duty cycle of the PFM switching signal is implemented by shortening the predetermined constant ON-time of the PFM switching signal.

6. The method according to claim 5, wherein:
the predetermined constant ON-time of the PFM switching signal is shortened in accordance with an absolute difference between the output voltage and the predetermined target voltage.

7. The method according to claim 6, wherein:
the predetermined constant ON-time of the PFM switching signal is shortened along with an increase of the absolute difference between the output voltage and the predetermined target voltage.

8. The method according to claim 1, wherein:
the predetermined target voltage is a DC component of the output voltage.

9. The method according to claim 1, wherein:
in the step of reducing the duty cycle of the PFM switching signal, the duty cycle of the PFM switching signal is reduced in accordance with an absolute difference between the output voltage and the predetermined target voltage.

10. The method according to claim 9, wherein:
the duty cycle of the PFM switching signal is reduced along with an increase of the absolute difference between the output voltage and the predetermined target voltage.

11. The method according to claim 1, wherein:
the PFM voltage regulator is operated in a heavy loading condition.

12. A method of reducing a ripple of a pulse frequency modulated (PFM) voltage regulator including an inductive means and a capacitive means, the inductive means being coupled to a DC voltage source and the capacitive means having a terminal coupled to the inductive means and providing an output voltage, the method comprising:
using a PFM switching signal for converting the DC voltage source to the output voltage such that a period of delivering energy from the inductive means to the capacitive means is longer than or equal to a predetermined minimum time;
detecting the output voltage; and
prolonging the period of delivering energy from the inductive means to the capacitive means by prolonging the predetermined minimum time when the output voltage is lower than a predetermined target voltage, whereby:
reducing the ripple of the output voltage.

13. The method according to claim 12, wherein:
the predetermined minimum time is prolonged in accordance with an absolute difference between the output voltage and the predetermined target voltage.

14. The method according to claim 13, wherein:
the predetermined minimum time is prolonged along with an increase of the absolute difference between the output voltage and the predetermined target voltage.

15. The method according to claim 12, wherein:
the PFM voltage regulator is operated in a heavy loading condition, and
the predetermined target voltage is a DC component of the output voltage.

16. A method of reducing a ripple of a pulse frequency modulated (PFM) voltage regulator including an inductive means and a capacitive means, the inductive means being coupled to a DC voltage source and the capacitive means having a terminal coupled to the inductive means and providing an output voltage, the method comprising:
using a PFM switching signal for converting the DC voltage source to the output voltage such that a period of storing energy in the inductive means is shorter than or equal to a predetermined constant time;
detecting the output voltage; and
shortening the period of storing energy in the inductive means by shortening the predetermined constant time when the output voltage is lower than a predetermined target voltage, whereby:
reducing the ripple of the output voltage.

17. The method according to claim 16, wherein:
the predetermined constant time is shortened in accordance with an absolute difference between the output voltage and the predetermined target voltage.

18. The method according to claim 17, wherein:
the predetermined constant time is shortened along with an increase of the absolute difference between the output voltage and the predetermined target voltage.

19. The method according to claim 16, wherein:
the PFM voltage regulator is operated in a heavy loading condition, and
the predetermined target voltage is a DC component of the output voltage.

* * * * *